United States Patent
Satterfield (10) Patent No.: US 9,732,901 B2
(45) Date of Patent: Aug. 15, 2017

(54) VIDEO ARM ASSEMBLY

(76) Inventor: Johnny A. Satterfield, Northridge, CA (US)

(*) Notice: Subject to any disclaimer, the term of this patent is extended or adjusted under 35 U.S.C. 154(b) by 202 days.

(21) Appl. No.: 14/387,055

(22) PCT Filed: Mar. 22, 2012

(86) PCT No.: PCT/US2012/030193
§ 371 (c)(1),
(2), (4) Date: Sep. 22, 2014

(87) PCT Pub. No.: WO2013/141869
PCT Pub. Date: Sep. 26, 2013

(65) Prior Publication Data
US 2015/0048230 A1    Feb. 19, 2015

(51) Int. Cl.
*F16M 11/20* (2006.01)
*B64D 11/00* (2006.01)
(Continued)

(52) U.S. Cl.
CPC ..... *F16M 11/2021* (2013.01); *B64D 11/0015* (2013.01); *B64D 11/00153* (2014.12);
(Continued)

(58) Field of Classification Search
CPC ...... F16M 11/10; F16M 11/12; F16M 11/121; F16M 11/126; F16M 11/2021; F16M 11/2035; F16M 11/2042; F16M 11/2064; Y10T 403/32254; Y10T 403/32262; Y10T 403/32319; Y10T 403/32401; Y10T 403/32409; Y10T 403/32426; Y10T 403/32434; B60R 2011/0014; B60R 2011/008; B60R 2011/0082;
(Continued)

(56) References Cited

U.S. PATENT DOCUMENTS 5,076,524 A * 12/1991 Reh ................... B60N 2/468
                                                    248/296.1
5,177,616 A *  1/1993 Riday ............... B64D 11/0015
                                                    248/917
(Continued)

FOREIGN PATENT DOCUMENTS

JP    06-296254    10/1994

OTHER PUBLICATIONS

International Search Report and Written Opinion for PCT/US2012/030193.

*Primary Examiner* — Jonathan Liu
*Assistant Examiner* — Guang H Guan
(74) *Attorney, Agent, or Firm* — Matthew J. Spark; Zuber Lawler & Del Duca LLP (57) ABSTRACT

A video arm assembly includes a base attachable to a surface, a knuckle rotatably engaging the base, and an arm connected to the knuckle. A friction clutch is connected to the base. A one-way bearing engages the friction clutch and the knuckle, providing rotation of the knuckle with respect to the base in a first direction only. The friction clutch engages the one-way bearing such that the knuckle rotates with respect to the base in a second direction opposite the first direction, the one-way bearing rotating with the knuckle in the second direction, and the arm rotating with the knuckle in the first and second directions.

19 Claims, 7 Drawing Sheets

(51) Int. Cl.
*F16M 11/12* (2006.01)
*F16M 11/18* (2006.01)
*F16M 13/02* (2006.01)
*B64D 11/06* (2006.01)

(52) U.S. Cl.
CPC ....... *B64D 11/0604* (2014.12); *F16M 11/121* (2013.01); *F16M 11/126* (2013.01); *F16M 11/18* (2013.01); *F16M 11/2035* (2013.01); *F16M 11/2064* (2013.01); *F16M 13/02* (2013.01)

(58) Field of Classification Search
CPC ..... B60R 2011/0085; B60R 2011/0087; B60R 11/0235; B60D 11/0015; B60D 11/00153
USPC ....... 248/291.1, 292.12, 278.1, 284.1, 286.1; 403/83, 84, 91, 101, 102, 104, 105; 297/188.14–188.19
See application file for complete search history.

(56) References Cited

U.S. PATENT DOCUMENTS

| | | | | |
|---|---|---|---|---|
| 5,179,447 A * | 1/1993 | Lain | .......................... | A47C 7/72 248/917 |
| 5,311,302 A * | 5/1994 | Berry | ...................... | A63F 13/08 348/14.03 |
| 5,374,104 A * | 12/1994 | Moore | ...................... | A47C 7/72 248/286.1 |
| 5,398,991 A * | 3/1995 | Smith | ........................ | A47C 7/72 248/919 |
| 5,547,248 A * | 8/1996 | Marechal | ........... | B64D 11/0693 248/278.1 |
| 5,667,179 A * | 9/1997 | Rosen | .................... | B60N 2/468 248/278.1 |
| 5,709,360 A * | 1/1998 | Rosen | .................... | B60N 2/468 248/278.1 |
| 5,996,954 A | 12/1999 | Rosen et al. | | |
| 6,007,036 A * | 12/1999 | Rosen | ................. | B60R 11/0235 224/281 |
| 6,179,263 B1 * | 1/2001 | Rosen | ................. | B60R 11/0235 248/278.1 |
| 6,427,957 B1 * | 8/2002 | Finneman | ............ | B60N 2/4686 248/185.1 |
| 6,450,828 B1 * | 9/2002 | Gordon | ............... | B60R 11/0235 348/E5.128 |
| 7,261,266 B2 | 8/2007 | Satterfield | | |
| 7,317,611 B2 | 1/2008 | Dittmer | | |
| 7,929,846 B2 * | 4/2011 | Sukenari | .............. | F16M 11/048 396/428 |
| 8,322,670 B2 * | 12/2012 | Westerink | .......... | B64D 11/0015 16/363 |
| 8,474,384 B2 * | 7/2013 | Sundarrao | ................ | A47B 3/00 108/42 |
| 8,523,130 B2 * | 9/2013 | Westerink | .......... | B64D 11/0015 16/363 |
| 8,704,960 B2 * | 4/2014 | Weaver | ............... | B60R 11/0235 192/107 C |
| 9,010,852 B1 * | 4/2015 | Conrad | ............... | B60R 11/0229 297/135 |
| 2006/0255222 A1* | 11/2006 | Akouka | ................... | B25J 9/041 248/291.1 |
| 2008/0029661 A1 | 2/2008 | Chen | | |
| 2011/0147546 A1 | 6/2011 | Monsalve et al. | | |
| 2011/0149510 A1 | 6/2011 | Monsalve et al. | | |
| 2011/0260017 A1* | 10/2011 | Monsalve | ............ | F16M 11/04 248/201 |
| 2015/0048230 A1* | 2/2015 | Satterfield | ............ | F16M 11/121 248/278.1 |

* cited by examiner

VIDEO ARM ASSEMBLY

BACKGROUND OF THE INVENTION

Area of the Art

The present invention relates generally to support arms. More particularly, the present invention relates to a video monitor support arm.

Description of the Background Art

Today, it is common for both private and commercial passenger aircraft to have an in-flight entertainment (IFE) system. An IFE system generally comprises an entertainment content source, such as a computer server having entertainment and/or information media (e.g., movies, music, television shows and/or other entertainment media content) stored in digital format; a wired or wireless networking system as required to transmit the entertainment media throughout the aircraft; and at least one video display monitor to present the entertainment media to at least one passenger in his or her seat. Each passenger may have his or her own personal video display monitor associated with his or her seat to provide that passenger with entertainment and/or information. Each seat may include or be associated with a video arm (i.e., a mechanical deployment arm) used to deploy, position and/or support the particular video display monitor associated with that seat so that the entertainment and/or information displayed on the video display monitor can be more easily viewed by the passenger associated with that seat. The video arm allows the video display monitor, when not in use, to be stowed securely under a seat, between seats or inside a seat console associated with one or more seats. The video arm may also allow the video display monitor to be deployed from a stowed position and positioned in front of the particular passenger associated with that video display monitor in a deployed position.

Different types of support arms have been proposed to provide a video display monitor that can be readily moved between stowed and deployed positions. However, such supports have their limitations and can always be improved.

Accordingly, there is a need for a video monitor support arm movable between stowed and deployed positions that requires minimal force to move between the stowed and deployed positions. There is a further need for a video monitor support arm that virtually eliminates rotational friction resistance at a main pivot joint in the direction of deployment. There is a need for a video monitor support arm with improved control of friction at a main pivot joint. There is a further need for a main pivot mechanism that is easier to adjust and maintain. There is an additional need for a video monitor support arm that is easier to manufacture, assemble, adjust, and maintain. The present invention satisfies these needs and provides other related advantages.

SUMMARY OF THE INVENTION

The present invention comprises a video arm (i.e., a mechanical deployment arm) that supports and deploys a video display monitor, such as a flat panel monitor of the type typically found on passenger aircraft, trains, cars and other vehicles. An improved video arm has been developed for managing friction requirements in a main pivot joint by employing a dual component system: a one-way bearing in combination with a friction clutch to control the respective amount of force required to deploy and stow the video arm. Ideally, to reduce the amount of manual force required to deploy a video arm, there would be absolutely zero friction in the main pivot joint when deploying a video arm upwards from a stowed position, but a sufficient amount of friction is still required to hold the video arm in the deployed position (or in any position between the stowed and fully deployed positions), countering the effect of gravity on the video arm and preventing the video arm from moving downwards under its own weight (including the weight of the video monitor). The goal is to minimize the force required to manually deploy the video arm and move the video arm to a fully upright deployed position, while simultaneously setting the amount of force required to manually push the video arm back down towards the stowed position to an optimum value, one that is conducive to a) keeping the video monitor firmly in place while viewing, and b) allowing the video arm to be stowed with a reasonably small amount of manual force. With this dual component system, the two competing friction requirements are distributed across the two separate components, one designed for zero (or near zero) friction (i.e., the one-way bearing) and the other (i.e., the friction clutch) designed for its gravity-cushioning/counteracting effect. These cooperative components provide a simple, reliable arrangement that is easy to adjust and maintain, reducing the amount of force required to move the video arm from the stowed position to the deployed position to merely about that required to counter the weight of the video arm (because frictional resistance is virtually zero in the direction of deployment) and reducing the amount of force required to move the video arm from the deployed position to the stowed position to only about that amount of force required to overcome the frictional resistance provided by the friction clutch. In an embodiment of the present invention, these two separate but cooperative components (e.g., the one-way bearing and the friction clutch) are used for controlling arm deployment and stowage in a way that distributes the frictional workload, whereby the one-way bearing reduces the amount of force required to be manually applied to the video arm during deployment to approximately the minimum amount required to counter the weight of the video arm (including the video monitor) as the video arm moves from the stowed position to the deployed position, while the friction clutch provides the amount of force required to hold the video monitor upright during and after deployment, at least countering the force exerted by the weight of the video arm (including the weight of the video monitor) that would move the video arm back towards the stowed position. The one-way bearing minimizes friction during deployment, such that the weight of the video arm (including the video monitor) alone is the only significant force to be overcome. In this type of arrangement, should a user's hand slip during deployment, the video arm cannot fall backwards because the one-way bearing permits motion in one direction only (i.e., the direction of deployment) and the friction clutch separately takes care of the other force requirement by providing at least the amount of frictional force required to hold the video arm firmly in place at all stages of deployment while still allowing the video arm to be stowed when needed using a minimal amount of manual force.

In an illustrative embodiment, a video arm assembly includes a base attachable to a surface, a knuckle rotatably engaging the base, and an arm connected to the knuckle. A friction clutch is connected to the base. A one-way bearing engages the friction clutch and the knuckle, providing rotation of the knuckle with respect to the base in a first direction only. The friction clutch engages the one-way bearing such that the knuckle rotates with respect to the base in a second direction opposite the first direction, the one-way bearing rotating with the knuckle in the second direction, and the arm rotating with the knuckle in the first and second directions. The assembly further includes a mount fixed to the arm opposite the knuckle for supporting a video monitor. The mount and video monitor can be rotatable relative to the arm. The arm itself can be rotatable relative to the knuckle. The knuckle includes a spindle engaging the one-way bearing. The base includes a track, the knuckle engages the track, and the track limits rotation of the knuckle. The knuckle can also include rollers engaging the track. The base limits rotation of the arm. The assembly further includes a stop and a latch removably engaging the stop. The latch prevents movement of the knuckle in the first direction when the latch engages the stop.

The video arm assembly provides a video monitor support arm movable between stowed and deployed positions that requires minimal force to move between the stowed and deployed positions. Likewise, the video arm assembly virtually eliminates rotational friction resistance at a main pivot joint in the direction of deployment. The video arm assembly provides improved control of friction at a main pivot joint. The video arm assembly additionally provides a main pivot mechanism that is easier to adjust and maintain.

Other features and advantages of the present invention will become apparent from the following more detailed description, taken in conjunction with the accompanying drawings, which illustrate, by way of example, the principles of the invention.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved video arm assembly.

As shown in FIGS. 1-10 for purposes of illustration, an embodiment of the present invention resides in a video monitor support arm assembly or video arm assembly 20 movable between stowed and deployed positions. The assembly 20 includes a support structure or base 22 which acts as the main structural support for the assembly 20. The assembly 20 further comprises an at least partially hollow knuckle mount 24, a hollow arm shaft 26, and an at least partially hollow video monitor mount 28 upon which a video monitor 30 (e.g., a flat panel monitor such as a Liquid Crystal Display (LCD) screen) is mounted. The assembly 20 also includes a latch mechanism 32 used to hold the assembly 20 in a stowed position and to release the assembly 20 from the stowed position when a user desires to move the assembly 20 into a deployed position. The base 22 and knuckle mount 24 cooperate to act as a main pivot joint assembly 34 for the assembly 20 where the knuckle mount 24 rotates relative to the base 22 about a pivot axis 36.

The base 22 may come in various forms including, without limitation, a bracket, housing or the like. The base 22 may comprise multiple components or be of single-piece construction. The base 22 is attachable to a surface (not shown) which may be a surface on a vehicle (e.g., aircraft) bulkhead, an exterior side of a vehicle chair or a side of a console housing or compartment located next to or part of the vehicle passenger seat or chair. The base 22 is attachable to the surface using mechanical fasteners (e.g., screws, nuts and bolts, etc.), chemical fasteners (e.g., glue, adhesive, etc.) or the like. In the alternative, the base 22 (or at least a portion thereof) may be formed of single-piece construction with the surface (e.g., formed as part of a seating console in a passenger aircraft).

The hollow arm shaft 26 is operationally connected to the knuckle mount 24 via engagement of the arm shaft 26 with a hollow tubular shaft mount 38 connected to the knuckle mount 24. The tubular shaft mount 38 comprises a hollow tubular shaft 40 (see FIG. 4) with an annular flange 42 disposed about one end of the mount 38. The shaft 40 of the shaft mount 38 is generally co-axial with the arm shaft 26. The annular flange 42 of the shaft mount 38 is at least partially received within a generally cylindrical recess 44 of the knuckle mount 24. The cylindrical recess 44 is sized and shaped to accommodate the annular flange 42 of the shaft mount 38. The shaft mount 38 is removably connected to the knuckle mount 24 using fasteners 46 (e.g., screws, nuts and bolts, etc.) inserted through apertures 48 in the annular flange 42 to operationally engage apertures 50 within the recess 44 of the knuckle mount 24. The engagement of the shaft mount 38 and knuckle mount 24 prevents rotational movement between the shaft mount 38 and the knuckle mount 24. The recess 44 also includes an aperture (not shown) though which a wiring harness 52 (e.g., a wiring harness that is part of an IFE system or the like) passes from the knuckle mount 24 through the shaft mount 38 into and through the hollow arm shaft 26 to enter and pass through the video monitor mount 28 where the wiring harness 52 is operationally connected to the video monitor 30.

The assembly 20 also includes an arm clutch assembly 54 disposed between the arm shaft 26 and the shaft mount 38. The arm clutch assembly 54 engages both the arm shaft 26 and the shaft 40 of the shaft mount 38 (at least a portion of the tubular shaft 40 being disposed within the arm shaft 26), providing rotational resistance between the arm shaft 26 and the shaft mount 38 as the arm shaft 26 rotates about a longitudinal axis 56 passing through a cross-sectional center of the arm shaft 26 and a cross-sectional center of the shaft mount 38. Due to the connection between the shaft mount 38 and the knuckle mount 24, the shaft mount 38 is non-rotatable about the longitudinal axis 56. The arm clutch assembly 54 is disposed within an interior of the hollow arm shaft 26, the interior of the hollow arm shaft 26 being sized and shaped to receive the arm clutch assembly 54 such that arm shaft 26 and arm clutch assembly 54 are non-rotatable relative to each other about the longitudinal axis 56. The arm clutch assembly 54 is generally co-axial with the arm shaft 26 and the shaft 40 of the shaft mount 38 along the longitudinal axis 56. The arm clutch assembly 54 and shaft mount 38 are rotatable relative to each other about the longitudinal axis 56 once the frictional resistance between the arm clutch assembly 54 and the shaft 40 of the shaft mount 38 is overcome. The engagement of arm clutch assembly 54 and the shaft 40 of the shaft mount 38 provides the frictional resistance between the arm shaft 26 and the shaft mount 38 since the arm shaft 26 and arm clutch assembly 54 rotate together about the longitudinal axis 56 once the frictional resistance between the arm clutch assembly 54 and the shaft 40 of the shaft mount 38 is overcome. The arm clutch assembly 54 includes a clutch 58 disposed within the hollow arm shaft 26 between the internal wall of the arm shaft 26 and an exterior surface of the tubular shaft 40 of the shaft mount 38. A spring strap (e.g., a U-shaped flexible clip) (not shown) includes legs that curve inwardly to grip a slot 60 of the clutch 58 to press the clutch 58 against the exterior surface of the tubular shaft 40 of the shaft mount 38. The spring strap is disposed between the slot 60 of the clutch 58 and the internal wall of the arm shaft 26. The clutch 58 is positioned around the shaft 40 of the shaft mount 38 while still relatively loose and the spring strap is then positioned within the slot 60 to press the clutch 58 against the exterior of the tubular shaft 40 of the shaft mount 38. The clutch 58 is generally C-shaped in cross-section and the spring strap acts to close an adjustment gap 62 between the ends of the "C", tightening the clutch 58 about the tubular shaft 40 of the shaft mount 38. The end of the arm shaft 26 is then positioned around the tubular shaft 40, clutch 58 and spring strap. The arm shaft 26 is held in position by fasteners (e.g., screws, nuts and bolts, etc.) (not shown) that extend through apertures (not shown) on the arm shaft 26 and apertures 64 aligned therewith on the clutch 58, connecting the arm shaft 26 and clutch 58, thereby operationally connecting the arm shaft 26 to the knuckle mount 24. The arm shaft 26, now secured to the clutch 58, rotates about the tubular shaft 40 (and about the axis 56), with the clutch 58 providing rotational resistance due to the spring force exerted by the spring strap against the clutch 58. Once secured around the tubular shaft 40, the clutch 58 rotates about the tubular shaft 40 but cannot move past a lip (not shown) of the tubular shaft 40. The lip on the tubular shaft 40 is designed to keep the clutch 58 from moving axially off the end of the tubular shaft 40. In the alternative, instead of a lip, a snap ring may be used to retain the clutch 58.

The assembly 20 further comprises a hollow elbow 66 between the arm shaft 26 and the video monitor mount 28. The elbow 66 may be of unitary single-piece construction with the arm shaft 26 or a separate component connected to the arm shaft 26 using mechanical, chemical or other fastening methods. As outlined above, the video monitor mount 28 is the attachment point for the video monitor 30 being operatively connected to the video monitor mount 28 by fasteners (e.g., screws, nuts and bolts, etc.) (not shown). The video monitor mount 28 extends outwardly from the elbow 66 and generally perpendicular to the arm shaft 26. The video monitor mount 28 (along with the monitor 30) rotates about an axis 68 (the axis 68 being perpendicular to the longitudinal axis 56) and acts as the final deployment element for viewing position adjustment. The video monitor mount 28 (along with the monitor 30) rotates about the axis 68 such that the monitor 30 can be tilted up to about fifteen degrees towards or away from the user (about a thirty degree range of rotation) when the monitor 30 is in an upright position. In the alternative, the elbow 66 is rotatable about the axis 56 relative to the arm shaft 26 (with a clutch assembly (not shown) disposed between the arm shaft 26 and the elbow 66 to control rotational movement of the elbow 66 relative to the arm shaft 26 as the elbow 66 rotates about the axis 56), this rotational movement supplementing the rotational movement of the arm shaft 26 relative to the tubular shaft 40. In a further alternative, in order to provide length to allow for more compact stowage, the monitor 30 does not extend over the elbow 66 so that it can be rotatable about the axis 68 passing longitudinally through a cross-sectional center (generally) of the video monitor mount 28 in order to be stowed upside down.

The video monitor mount 28 includes a flat mounting section in the form of an adapter plate 70 upon which the video monitor 30 is mounted. The monitor 30 includes a flat mounting section at a bottom of the monitor 30 for engaging the adapter plate 70. The mounting section of the monitor 30 is positioned adjacent to the adapter plate 70 on the video monitor mount 28. The monitor 30 is connected to the mount 28 by fasteners (e.g., screws, nuts and bolts, etc.) (not shown) extending through apertures 72 on the adapter plate 70 that are aligned with apertures (not shown) on the flat mounting section of the monitor 30 such that the fasteners pass into and operationally engage the apertures of the flat mounting section of the monitor 30. The adapter plate 70 further includes a wiring aperture 74 through which the wiring harness 52 passes from the interior of the video monitor mount 28 to operationally connect with the video monitor 30. The assembly 20 includes a mount clutch assembly (not shown) disposed between the video monitor mount 28 and the elbow 66 of the arm shaft 26 to resist rotational movement of the video monitor mount 28 relative to the arm shaft 26 as the video monitor mount 28 rotates about the axis 68. As pointed out above, the elbow 66 (along with the arm shaft 26) rotates about the longitudinal axis 56 and acts as a secondary deployment element.

Figure 1:
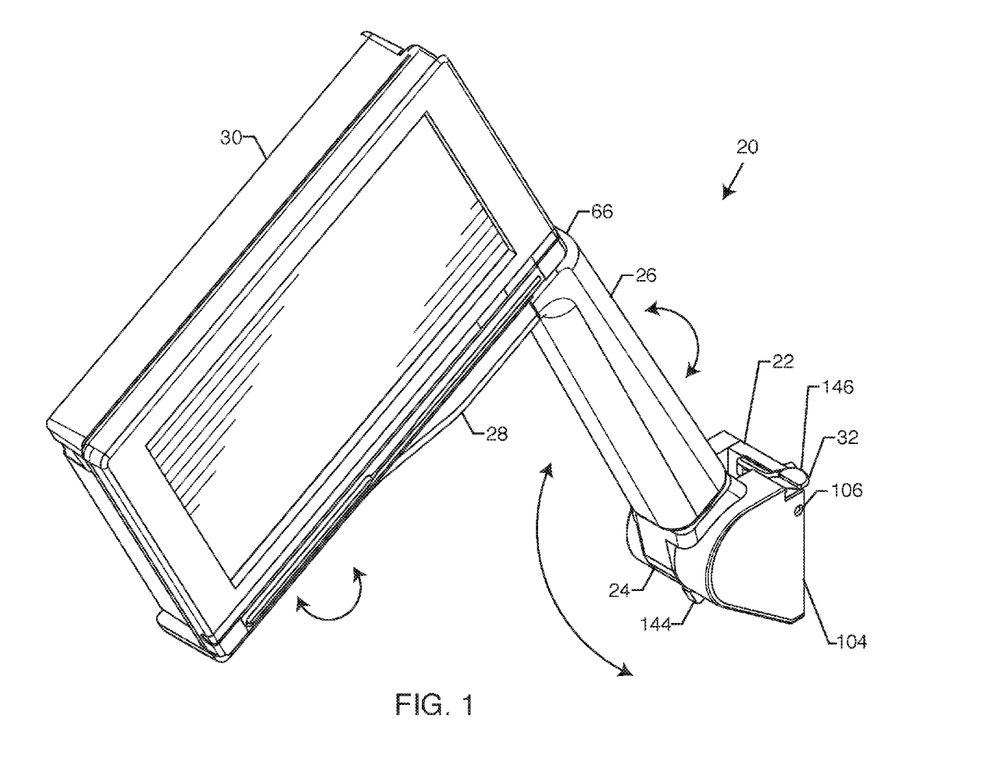
FIG. 1 is a perspective view of a video arm assembly illustrating an embodiment of the present invention in a partially deployed position.
Figure 2:
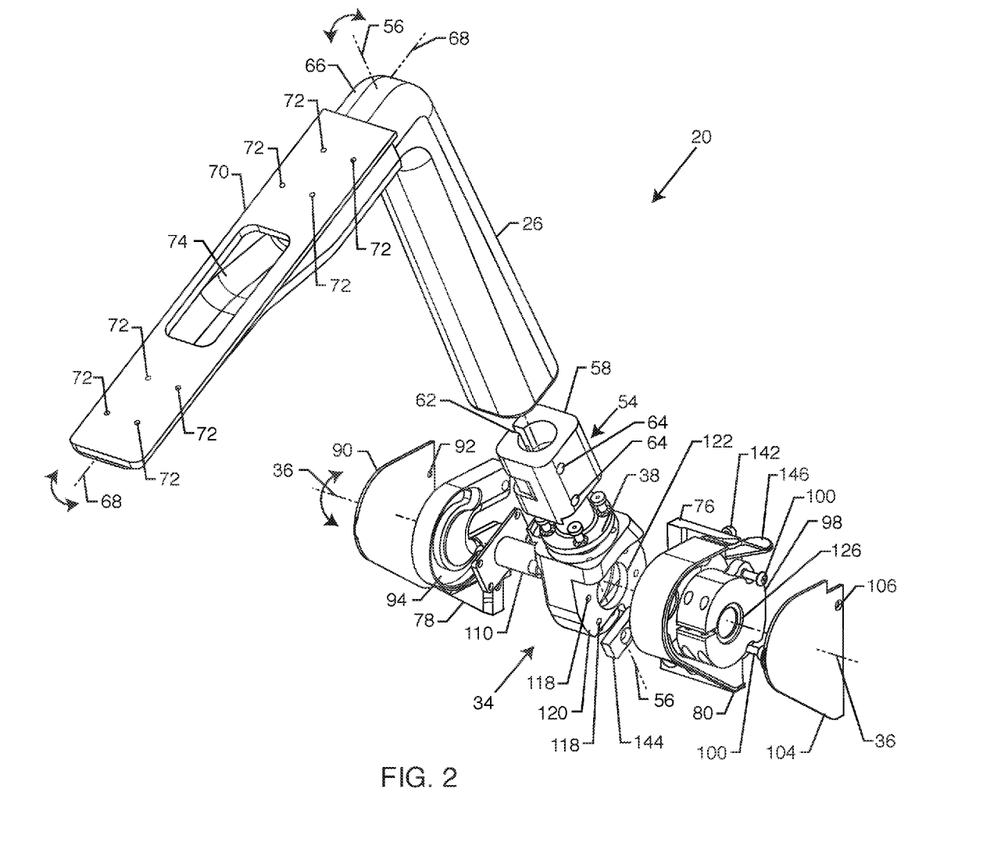
FIG. 2 is an enlarged exploded perspective view from one angle of the video arm assembly of FIG. 1.
Figure 3:
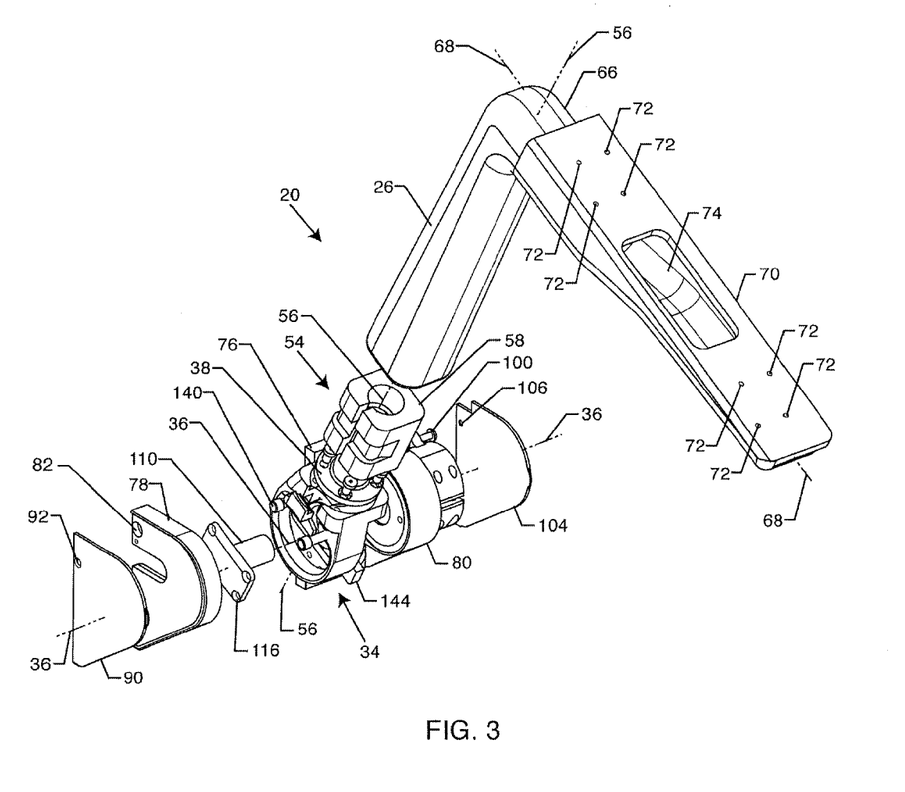
FIG. 3 is an enlarged exploded perspective view from a different angle than FIG. 3 of the video arm assembly of FIG. 1.
Figure 4:
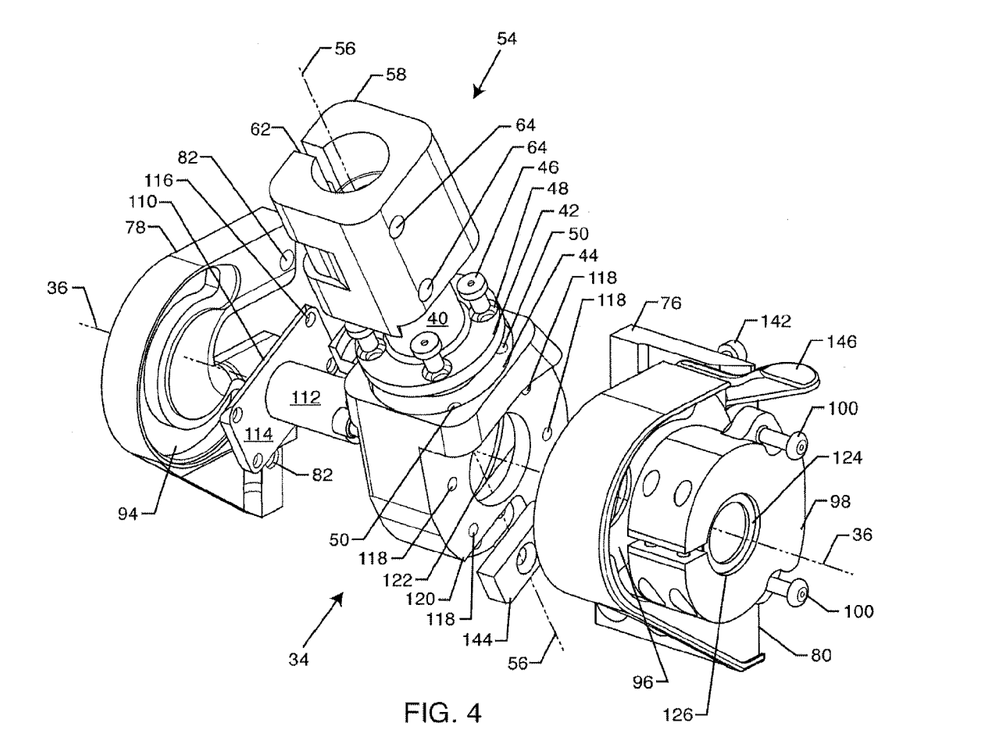
FIG. 4 is an enlarged exploded perspective view from one angle of a main pivot joint of the video arm assembly of FIG. 2.
Figure 5:
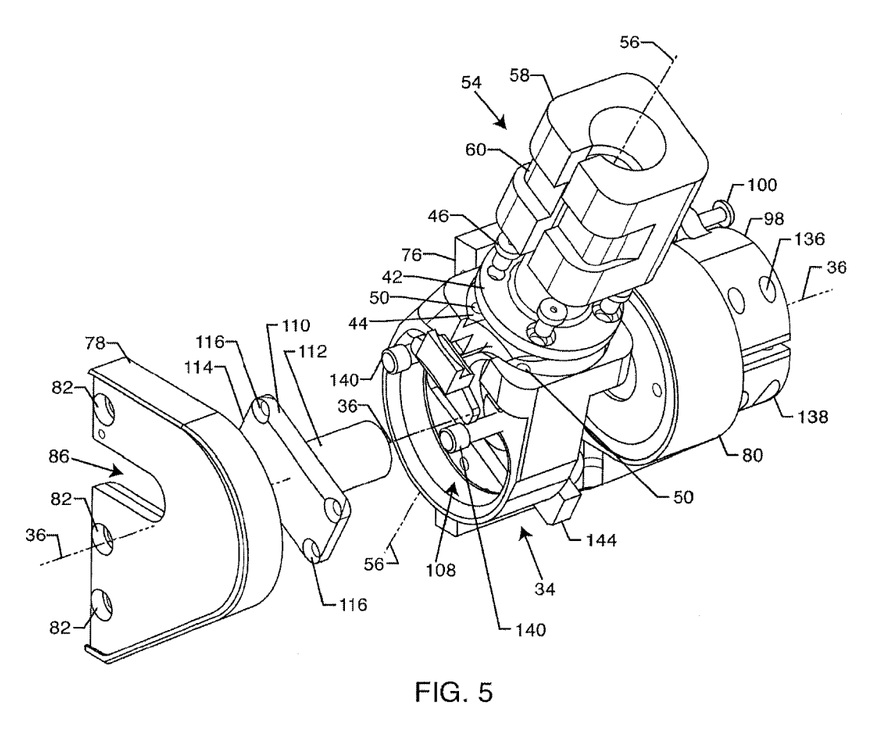
FIG. 5 is an enlarged exploded perspective view from a different angle than FIG. 4 of the main pivot joint of the video arm assembly of FIG. 2.
Figures 6, 7, 8:
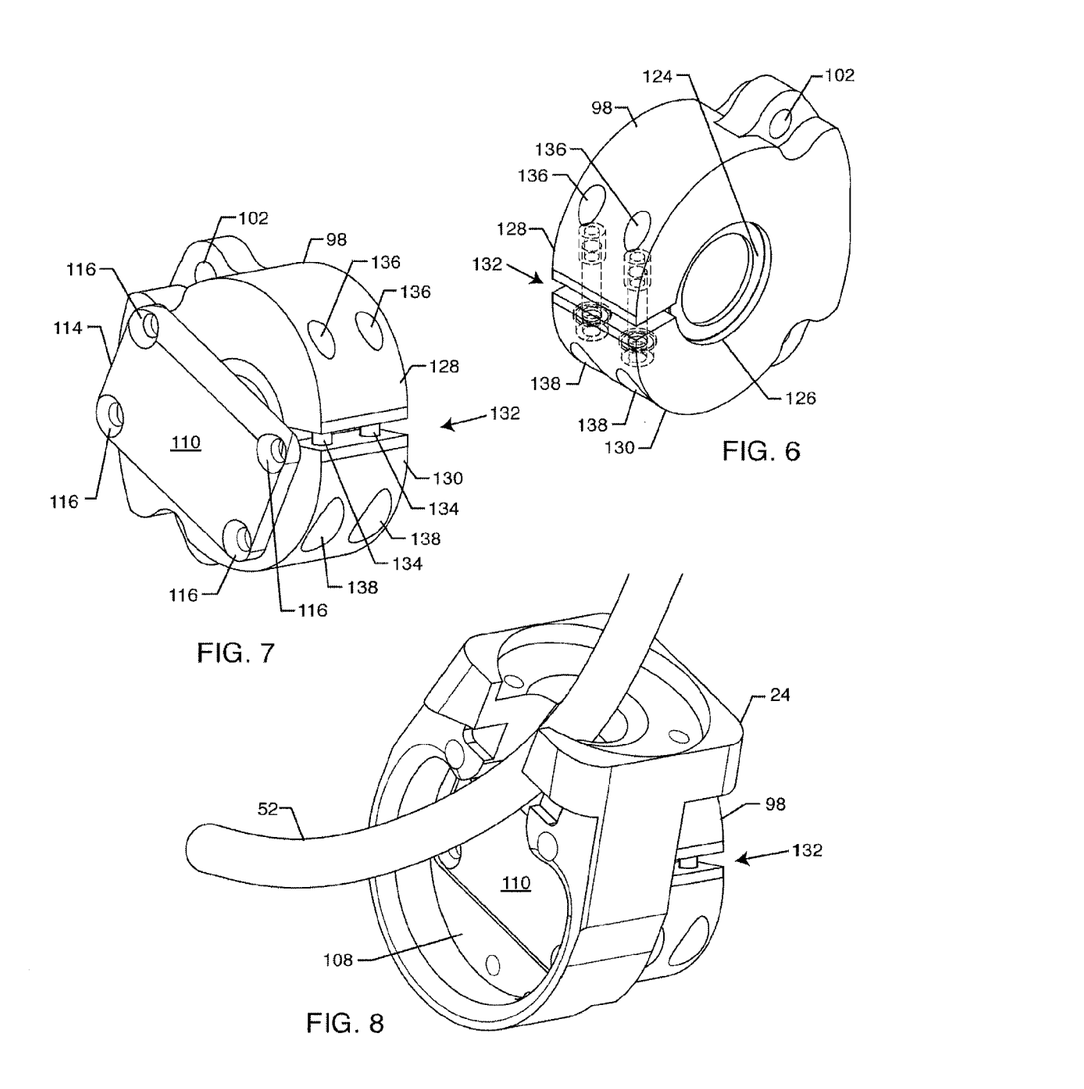
FIG. 6 is an enlarged view illustrating engagement of a clutch, one-way bearing and spindle of the video arm assembly of FIG. 1.
FIG. 7 is another enlarged view illustrating engagement of the clutch, one-way bearing and spindle of the video arm assembly of FIG. 1.
FIG. 8 is a perspective view of a wiring harness passing through a knuckle mount of the video arm assembly of FIG. 1 where the spindle is connected to the knuckle mount and engages the one-way bearing and friction clutch.
Figures 9, 10:
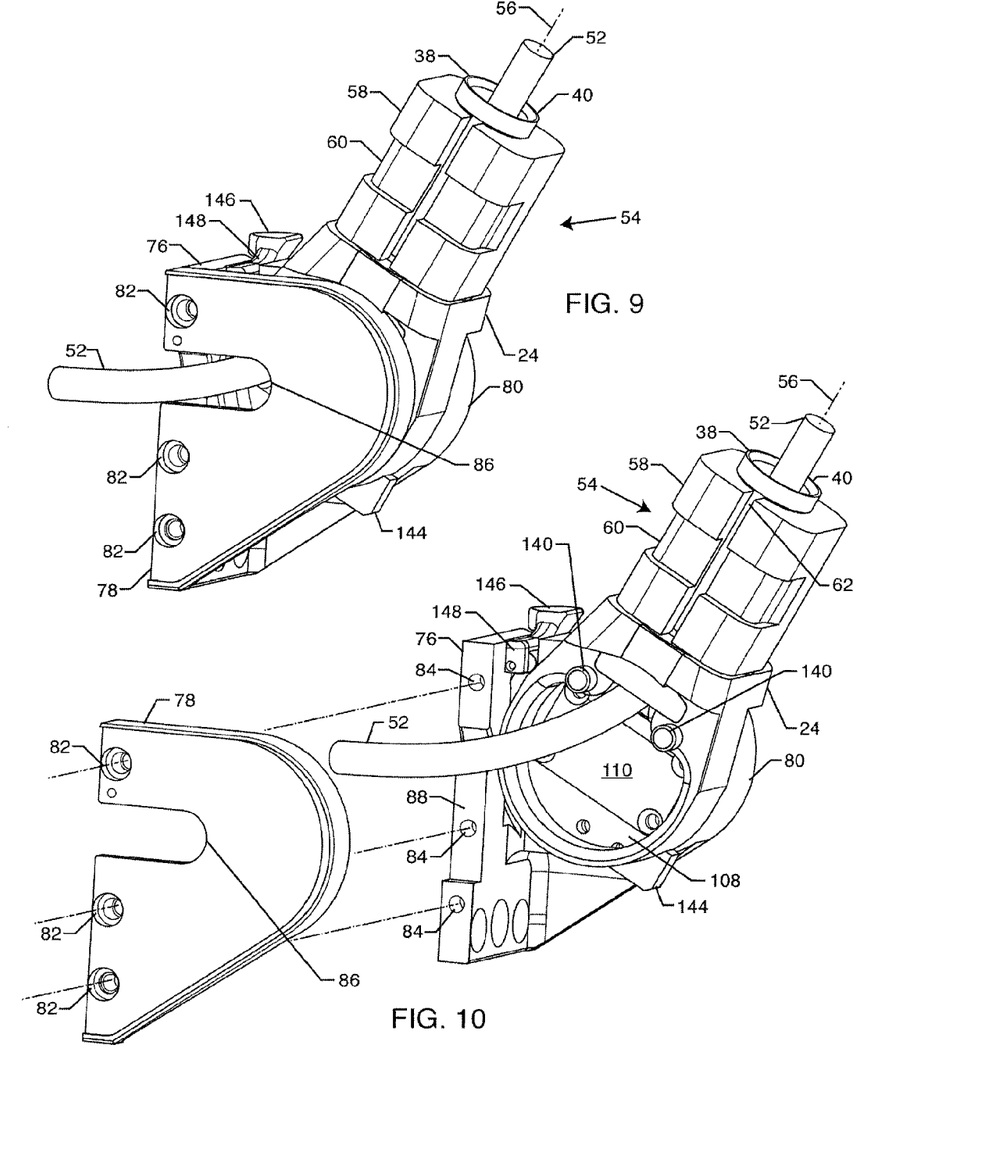
FIG. 9 is a perspective view of a main pivot joint of the assembly of FIG. 1 illustrating a wiring harness passing through an aperture into a main pivot joint of the video arm assembly of FIG. 1.
FIG. 10 is another view similar to FIG. 9 but with a bracket cover exploded from the video arm assembly, thereby illustrating the wiring harness passing through the main pivot joint of the video arm assembly.

As illustrated in FIGS. 2 and 3, an embodiment of the base 22 comprises a bracket assembly that includes a base portion 76, a first pivot portion 78 and a second pivot portion 80. The first pivot portion 78 is removably connected to the base portion 76 by fasteners (e.g., screws, nuts and bolts, etc.) (not shown) which are inserted through apertures 82 in the first pivot portion 78 into apertures 84 on a side of the base portion 76 (see FIGS. 9 and 10). The first pivot portion 78 includes an elongated aperture 86 that at least partially defines a larger aperture for passage of the wiring harness 52 into the assembly 20 at the base 22. The side of the base portion 76 which engages the first pivot portion 78 includes a recess 88 which also at least partially defines the larger aperture for passage of the wiring harness 52 into the assembly 20 at the base 22. A cover 90 (FIGS. 2 and 3) is connected to an outer side of the first pivot portion 78 using fasteners (e.g., screws, nuts and bolts, etc.) (not shown) passing through an aperture 92 of the cover 90.

As pointed out above, the base 22 and knuckle mount 24 cooperate to act as the main pivot joint assembly 34 for the assembly 20. The knuckle mount 24 operationally engages the base 22 and serves as a support mount for the arm shaft 26. Engagement of the knuckle mount 24 with the base 22 allows the arm shaft 26 to be moved between stowed and deployed positions. The first pivot portion 78 of the base 22 comprises a housing that includes a curved recess, groove or track 94 (see FIGS. 2 and 4) formed on an inner surface therein that faces the knuckle mount 24. The track 94 can be designed to provide any desired degree of rotation between the stowed and deployed positions. There may be as little as thirty degrees between the stowed and deployed positions and as much as two hundred seventy degrees between the stowed and deployed positions. As illustrated, the track 94 provides about one hundred sixty five degrees of rotation between the stowed and deployed positions. The second pivot portion 80 is removably connected to the base portion 76 by fasteners (e.g., screws, nuts and bolts, etc.) (not shown). The second pivot portion 80 comprises a housing that defines a recess 96 into which a friction clutch 98 is disposed. The friction clutch 98 may be in the form of a slip clutch or safety clutch (i.e., a friction clutch that will slip when the torque is too great). The friction clutch 98 is removably connected to the second pivot portion 80 by fasteners 100 (e.g., screws, nuts and bolts, etc.) inserted through apertures 102 in the friction clutch 98 to engage apertures (not shown) in the second pivot portion 80. A cover 104 is connected to an outer side of the second pivot portion 80 using fasteners (e.g., screws, nuts and bolts, etc.) (not shown) passing through an aperture 106 of the cover 104.

As pointed out, the knuckle mount 24 is a part of the main pivot joint assembly 34 of the video arm assembly 20. The knuckle mount 24 includes a cavity or recess 108 for receiving a spindle 110 which is connected to the knuckle mount 24. The spindle 110 comprises a cylindrical shaft 112 extending from a rectangular flange 114. The spindle 110 is removably connected to the knuckle mount 24 by fasteners (e.g., screws, nuts and bolts, etc.) (not shown) inserted through apertures 116 in the rectangular flange 114 of the spindle 110 to engage aligned apertures 118 on a side 120 of the knuckle mount 24. The four apertures 118 of the knuckle mount 24 are arranged in a rectangular pattern, and this same pattern exists with respect to the four apertures 116 of the flange 114 of the spindle 110.

The shaft 112 of the spindle 110 extends through a circular aperture 122 in the side 120 of the knuckle mount 24 to engage a generally cylindrically-shaped one-way bearing 124 held by the friction clutch 98 disposed within the recess 96. In general, one-way bearings are assemblies that contain small cylindrical hardened steel roller pins that allow free movement of the shaft 112 as the pins rotate in one direction (i.e., a "free" direction) while transmitting torque from the shaft 112 to the outer casing when rotated in the other direction (i.e., the locked direction). One-way bearings may also be referred to as clutch bearings, drawn-cup needle-roller clutches, or anti-reverse bearings. In general, one-way bearings comprise: a casing (i.e., the outer part that is typically in the form of a piece of steel tubing with the ends formed over to retain the inner components); needle rollers (e.g., hard chrome plated steel pins that provide a smooth, consistent rolling surface for contact with the shaft 112); springs (e.g., heat treated strips of spring steel that control the position of the needle rollers), and a cage (i.e., the inner part (typically made from a hard plastic material) that functions as a retaining, limiting and locking mechanism for the needle rollers and spring). For example, the cage is designed in such a way as to allow the needle rollers to move sideways relative to the shaft 112. The cage also has a ramp/wedging mechanism built in to act as a brake/clutch for the needle rollers. For example, the one-way bearing 124 includes a central generally cylindrical recess (not shown) which receives and engages an end portion of the shaft 112 of the spindle 110. The central generally cylindrical recess generally defining an inner diameter of the one-way bearing 124. The cylindrical shaft 112 of the spindle 110 is held within the recess of the one-way bearing 124 by frictional contact between the cylindrical shaft 112 of the spindle 110 and the needle rollers (the needle rollers encircling the shaft 112 defining an inner diameter slightly less than that of the cage as well as generally defining the inner diameter of the one-way bearing 124). The one-way bearing 124 may come in various forms including, without limitation, a needle-roller bearing in which the rollers inside the bearing cage turn freely in one direction, while in the opposite direction the rollers wedge against the cage, thereby preventing motion in that direction. When turning force is applied in the locking direction, the torque is transferred instead to an outside diameter of the one-way bearing 124; this surface may or may not permit motion at its interface, depending on how loosely or tightly it is captured by any surrounding structure, such as the friction clutch 98. For example, the one-way bearing 124 is disposed and held within a central aperture 126 of the friction clutch 98. Alternatively, instead of the one-way bearing 124 interfacing directly with the friction clutch 98, the one-way bearing 124 can be press-fit into a hardened steel bearing sleeve (not shown). The outside diameter of the bearing sleeve would fit into the aperture 126 of the friction clutch 98. Bearing sleeves typically offer improved hardness and wear properties, and a smoother surface finish, thereby providing more tightly controlled torque values at the interface between the outside of the bearing sleeve and the friction clutch 98. The one-way bearing 124 provides virtually zero friction in the direction of deployment (e.g., the needle roller bearing has a very low coefficient of friction on about 0.003 (kinetic). Compare, for example, to a coefficient of friction of 0.05 for waxed skis on snow (about sixteen times higher), or 0.04 for TEFLON (brand of polytetrafluoroethylene) sliding on TEFLON).

In operation, an end of the cylindrical shaft 112 of the spindle 110 engages with the inside diameter of the one-way bearing 124 (e.g., the end of the cylindrical shaft 112 of the spindle 110 is press-fit into the array of roller needles within the one-way bearing 124). For reference, the "inner diameter" of the one-way bearing 124 refers to the engagement interface between the shaft 112 of the spindle 110 and the one-way bearing 124. The "outer diameter" of the one-way bearing 124 refers to the engagement interface between the one-way bearing 124 and the friction clutch 98. As the one-way bearing 124 allows motion in one direction only (i.e., in a "free" direction), the freedom of motion is in the direction of the upward deployment of the video arm. The one-way bearing 124 prohibits motion in the opposite direction (i.e., the one-way bearing is "locked" with respect to motion in the opposite direction), such that the video arm is not able to fall back down towards the stowed position and will remain at whatever point the user decides to leave it on the way up due, at least in part, to the one-way bearing 124 being "locked" in the direction of stowage and, at least in part, to the engagement of the one-way bearing 124 and the friction clutch 98. When the cage of the one-way bearing 124 is rotating in the "free direction," the needle rollers are resting against the springs, which control how far the needle rollers can move in that direction. As there is no load on it in this position, the bearing spins freely. When the cage of the one-way bearing 124 is "locked," the needle rollers are lodged between the cage and the shaft, where the rollers cannot rotate.

As stated above, the one-way bearing 124 is held by and disposed within the generally cylindrical central aperture 126 of the friction clutch 98. The friction clutch 98 has a polymeric housing with a longitudinal split which provides the ability to adjust the effective size of the friction clutch 98 at its inner diameter, thereby changing the grip on the one-way bearing 124 captured inside the aperture 126 of the friction clutch 98, and ultimately providing the ability to select a desired frictional value to control the rotation of the one-way bearing 124 at the outer diameter of the one-way bearing 124 (i.e., the interface between the one-way bearing 124 and the friction clutch 98). The one-way bearing 124 is held within the aperture 126 by frictional contact between an outer surface (i.e., the outer diameter) of the cylindrically-shaped one-way bearing 124 and a sidewall of the cylindrically-shaped aperture 126 (which defines an inner diameter of the friction clutch 98). The friction clutch 98 is generally C-shaped in cross-section with a first adjustment end 128 and a second adjustment end 130 defining an adjustment gap 132 (i.e., the longitudinal split) therebetween. The adjustment gap 132 breaks the continuity of the sidewall of the aperture 126. The friction clutch 98 is adjusted by tightening or loosening two adjustment screws 134 to provide varying amounts of clamping force against the outside diameter of the one-way bearing 124. Each adjustment end 128, 130 includes two through holes or apertures 136, 138. A screw 134 is inserted through each aperture 136 on the first adjustment end 128 into an aligned aperture 138 on the second adjustment end 130. Tightening the screws 134 increases the frictional contact between the friction clutch 98 and the one-way bearing 124 by closing the adjustment gap 132 (i.e., decreasing the width of the adjustment gap 132 by bringing the adjustment ends 128, 130 closer together). The friction clutch 98 for a given arm design will always be able to provide more than enough friction to hold the video arm plus monitor 30 against gravity plus forces of vibration. The friction clutch 98 can be adjusted to provide up to three or four times that value. For example, a video arm-plus-monitor can weigh about six to eight pounds, but that could easily be more or less (e.g., in some cases ten to twelve pounds). A friction clutch 98, depending on its size and materials of construction, could, theoretically if needed, be made to provide twenty, fifty, one hundred or more pounds of resistance.

Aside from holding the one-way bearing 124 firmly in place, the friction clutch 98 does not factor into the deployment of the video arm because the friction between the spindle 110 and the one-way bearing 124 at the inner diameter of the one-way bearing 124 in the direction of deployment is nearly zero. That is, no significant amount of torque is transferred to the outer diameter of the one-way bearing 124 during the upward deployment cycle of the video arm 20.

Alternatively, in the construction of the friction clutch 98, instead of an adjustable split-polymeric housing, friction control may be produced instead by inserting the one-way bearing 124 into a steel cylinder which has a frictional load applied to its outer diameter by any of various means including torsion springs, generally "C"-shaped spring clips or the like. These spring clips may also be known as constant torque hinges, torque hinges, detent hinges or the like. In the foregoing alternative arrangement, the one-way bearing 124 is static against an inner diameter of the steel cylinder. When the video arm is being stowed, the outer diameter of the steel cylinder rotates inside the spring clips. The spring clips can be varied in number and strength so as to produce a desired total grip, which translates into a desired total sliding friction controlling the torque required to stow the arm. In a further alternative, the steel cylinder is not used and the spring clips directly surround the one-way bearing 124. In additional alternative embodiments, any of various friction-clutch devices providing a mechanism for controlling the sliding friction at the outer diameter of the bearing (or sleeve if the one-way bearing 124 is disposed within a sleeve), occurring as the video arm is rotated back into the stowed position, can be used. Such devices utilize methods such as a surrounding polymeric housing in which the inner diameter can be adjusted to increase or decrease the sliding friction; the use of one or more metal springs of various shapes and sizes to control the friction acting on the outer diameter of the one-way bearing or on the outer diameter of any sleeve into which the one-way bearing 124 is press-fit.

It should be noted that, if the one-way bearing 124 became disabled and unable to rotate in the free direction, the force/torque applied to the video arm in the direction of deployment would be transferred from the spindle 110 to the outer diameter of the one-way bearing 124, causing the one-way bearing 124 to rotate in the direction of deployment once enough force was applied to overcome the grip of the friction clutch 98 on the one-way bearing 124, the force/torque required to turn the one-way bearing 124 at its outer diameter interface with the friction clutch 98 being the same in both stowage and deployment directions (ignoring the weight of the arm), because the grip exerted at the outer diameter of the one-way bearing 124 (due to tightening of the friction clutch 98) results in one specific frictional value regardless of the direction of rotation.

The knuckle mount 24 engages the curved track 94 which allows the knuckle mount 24 to rotate approximately one hundred sixty five degrees, in accordance with the illustrated embodiment, allowing the arm assembly 20 to move between stowed and deployed positions. However, depending on the application, the rotation requirement could alternatively be as little as thirty degrees and as much as two hundred seventy degrees, or any value in between. The knuckle mount 24 includes at least two rollers 140 which engage the track 94. The rollers 140 provide an insignificant amount of frictional resistance between the rollers 140 and the surface of the track 94 as the assembly 20 moves between the stowed and deployed positions. Each roller 140 is set on a cylindrical shaft extending from the side of the knuckle mount 24. In the alternative, the knuckle mount 24 may include only a single roller or more than two rollers. In another alternative, rollers 140 are not present, in which case only the cylindrical shafts extending from the knuckle mount 24 engage the track 94. The length and curvature of the track 94 may be adjusted to increase the number of degrees of rotation available for deploying the video arm. As the upper arm assembly (e.g., the arm shaft 26, mount 28 and video monitor 30) attaches to the arm clutch 58 engaging the tubular shaft 40 of the shaft mount 38 attached to the top of the knuckle mount 24, when the upper arm assembly is moved up or down, the knuckle mount 24 to which the upper arm assembly is attached moves in the same direction, at which point the shaft 112 of the spindle 110 attached to the knuckle mount 24 either turns in the direction of deployment or locks in the direction of stowage within the one-way bearing 124. If the upper arm assembly is turned in the locking direction, the torque applied to the one-way bearing 124 is transferred to the interface between the friction clutch 98 and the one-way bearing 124 and the one-way bearing 124 will turn within the friction clutch 98, provided the turning force (i.e., the transferred torque) is sufficient to overcome the clamping force applied by the friction clutch 98 to the outside diameter of the one-way bearing 124. Thus, the knuckle mount 24 pivotally engages the base 22 at the first pivot portion 78 via the rollers 140 (i.e., the rollers 140 engaging the curved track 94) and at the second pivot portion 80 via the spindle 110 (which is fixedly connected to the knuckle mount 24) engaging the one-way bearing 124 (the one-way bearing 124 being held by the friction clutch 98 which itself is disposed within the second pivot portion 80 and connected thereto by fasteners).

The latch mechanism 32 includes a stationary, spring-loaded latch lever 148 operatively connected to a pivot pin or axle 142. The latch lever 148 has a button 146 on one end and a flat edge on the other end. The pivot axle 142 extends outwardly from the base 22 mounted to the surface. In the stowed position, one end of the latch lever 148 engages a flat-edged stop 144 extending outwardly from the knuckle mount 24. The stop 144 may be made of metal, plastic or the like. The engagement of the flat-edged end of the latch lever 148 and the stop 144 prevents the knuckle mount 24 from rotating. The latch lever 148 can be selectively disengaged from the stop 144 by pressing the button 146 on one end of the latch lever 148, allowing the knuckle mount 24 to rotate towards the deployed position. Pressing the button 146 causes the lever 148 to pivot about the pivot axle 142 extending through an aperture (not shown) in the base 22. The pivot axle 142 acts as an axis of pivot for the latch lever 148. Pressing the button 146 pivots the latch 148 away from the stop 144, disengaging the latch 148 from the stop 144 and freeing the knuckle mount 24 to rotate between the stowed and deployed positions. In the alternative, a different style of latching mechanism may be provided, such that the user pushing downward on the arm shaft 26 or other portion of the assembly 20 disengages the latch 148 from the stop 144, releasing the arm 20 from the stowed position.

The release of the stop 144 allows the knuckle mount 24, as well as anything attached to it (e.g., the entire upper video arm assembly) to rotate upwards, at which point the shaft 112 of the spindle 110 (which is attached to the knuckle mount 24) rotates within the one-way bearing 124. During deployment, the rotation of the knuckle mount 24 (as well as the upper video arm assembly) ends when the rollers 140 of the knuckle mount 24 reach the limit defined by a deployment end of the curved track 94 of the first pivot portion 78. Once the spring-loaded latch is disengaged from the stop 144 and the knuckle mount 24 rotates away from the stowed position, the latch will automatically pivot back to the position the latch was in when the latch first engaged the stop 144. However, the latch will not engage the stop 144 at this time since the stop 144 has rotated with the knuckle mount 24 away from the stowed position. When the knuckle mount 24 is rotated back to the stowed position, the stop 144 will re-engage the latch, holding the knuckle mount 24 in the stowed position.

Upon full deployment, the assembly 20 must firmly hold the monitor 30 in place while the aircraft (or other vehicle) moves and/or vibrates. Therefore, to prevent downward motion of the arm 20, the friction clutch 98 must provide sufficient frictional loading to counteract the weight of the arm 20 and monitor 30, plus any additional amount of frictional loading needed to account for turbulence in flight and/or other sources of vibration. In the embodiment as shown, to control the tilt angle of the monitor 30, the clutch assembly located between the elbow 66 and the video monitor mount 28 must be adjusted so as to provide approximately three to seven pounds of resistance. Higher or lower friction settings may be appropriate depending upon the application. The selected friction setting must not only support the monitor 30, holding the monitor 30 firmly in place, but also allow the monitor 30 to be easily adjusted manually by the passenger, and it must maintain that adjustment once made. The clutch assembly includes, respectively, a hollow cylindrical mounting tube shaft (similar to the tubular shaft of the tube mount 34), a clutch, and a spring strap. The spring strap exerts spring force to the clutch as the clutch wraps around its respective tube shaft to press the clutch against the tube shaft to create rotational resistance as the clutch rotates about the tube shaft. Alternatively in all such clutch locations, the loading/gap adjustment function performed by the spring strap may instead be performed by a set of adjustment screws, similar to the arrangement shown in the friction clutch 98. The tube shaft includes a central aperture through which the wiring harness 52 passes. The clutch assembly between the elbow 66 and the video monitor mount 28 is disposed within the hollow video monitor mount 28 between an internal wall of the hollow video monitor mount 28 and a tube shaft extending from the elbow 66. The spring strap (e.g., a U-shaped flexible clip) includes legs that curve inwardly to grip a slot on the outside of the clutch, so as to press the inside of the clutch against the tube shaft which is connected to the elbow 66. The spring strap is disposed between the slot of the clutch and the internal wall of the video monitor mount 28. The clutch is positioned around the tube shaft before the spring clip is attached to it. The spring strap is then snapped into the slot to press the clutch against the exterior of the tube shaft. The end of the video monitor mount 28 is then positioned around the tube shaft, clutch, and spring strap. The video monitor mount 28 is held in position by fasteners (e.g., screws, nuts and bolts, etc.) (not shown) that extend through apertures (not shown) on the video monitor mount 28 and into aligned apertures (e.g., threaded fittings) on the clutch body, thereby operationally connecting the video monitor mount 28 to the elbow 66. The video monitor mount 28, now secured to the clutch, rotates about the tube shaft (about the axis 68), with the clutch providing rotational resistance due to the spring force exerted by the spring strap against the clutch. Once secured around the tube shaft, the clutch is able to rotate about the tube shaft but cannot move axially past a lip on the end of the tube shaft. The video monitor mount 28 is thereby connected to the elbow 66 since the video monitor mount 28 is connected to the clutch. Likewise, if there were a clutch assembly (not shown) located between the arm shaft 26 and the elbow 66, that clutch assembly would be assembled together in a similar, if not identical, manner. The clutch assemblies between the arm shaft 26 and the knuckle mount 24 and between the elbow 66 and the video mount 28 allow for large-diameter electrical harnesses to pass through the hollow elements of the base 22, knuckle mount 24, arm shaft 26, elbow 66 and mount 28. In each of the aforementioned clutch assemblies, the frictional loading is achieved by using the spring strap to tighten the clutch around the tubular shaft, thereby providing the loading necessary to maintain approximately three to seven pounds of rotational resistance. The spring clip arrangement provides a space advantage over certain alternative clutch designs that use a set of screws to tighten the clutch. The arrangement with the adjusting screws requires a greater radial wall thickness of the clutch surrounding the tube shaft. In this case either the available inside diameter of the clutch must be reduced, or the outer diameter of the clutch body must be increased. If the inside diameter is decreased, the ability to accommodate larger diameter wiring harnesses is limited. If the clutch outer diameter is increased, the video arm in general must be radially increased in size accordingly. A further advantage of the spring clip design is elimination of the need to adjust the clutch settings using the two screws.

In use, the deployment stages required to bring the monitor 30 to its proper viewing position are as follows: 1) stowed position, 2) initial deployment, 3) secondary deployment, and 4) final deployment. In the stowed position, the monitor 30 is inserted into a space within a housing or console, into a space between passenger chairs, or into a space between a passenger chair and a bulkhead, and so on. In any event, the monitor 30 is out of sight of the passenger. In the initial deployment stage, the monitor 30 is pivoted vertically from the space in which it is stowed. This initial deployment is accomplished by the user either pushing a mechanical button associated with the latch mechanism 32 operationally connected to the assembly 20, or by pressing against the monitor 30 or the arm shaft 26, thereby activating a release mechanism that operates in a manner similar, if not otherwise identical, to the latch mechanism 32, as outlined above, or by any other means that will disengage the latch holding the arm in place. Pushing the button, the monitor 30, or the arm shaft 26 releases the latch mechanism 32 and allows the user to then manually pull the monitor 30 further pivotally upwards about the pivot axis 36 so that the arm shaft 26 is fully extended from the stowed position. In secondary deployment, the passenger swings the monitor 30 about the longitudinal axis 56 of the arm shaft 26, bringing the monitor 30 into the viewing plane of the passenger. In the final deployment stage, the passenger adjusts the monitor 30 in the forward or aft direction, by tilting the monitor 30 about the axis 68, to bring the monitor 30 to its most comfortable viewing angle.

An advantage of the present invention is that the frictional load in play when initially deploying the video arm is a much lower value than the frictional load applied when stowing the video arm. Ideally the frictional load acting on the arm during deployment is zero, as the task is simply to lift the arm from stowage to full height, and there is no advantage to any extra resistance during this task. On the other hand, during the act of stowage, it is important to prevent the arm from falling quickly or freely, and so in this case a certain amount of frictional load is both necessary and valuable. This asymmetrical quality of frictional loading solves the problems associated with symmetrical loading as found in some conventional designs. That is, for example, if the frictional loads during both the upward deployment and downward stowage phases were equal, the arm would either be significantly more difficult to deploy, or unable to hold itself firmly in position once deployed. For example, if the frictional loads were symmetrically "zero or near-zero," the video arm would deploy with minimal force, but would not be able to remain stably upright; the video arm would fall back down as soon as the user let go of it. On the other hand, if the symmetrical frictional loads were equal but higher, such that the arm remained firmly in position once deployed, the additional loading would make the arm more difficult to deploy in the first place. The ideal condition is a combination of asymmetrical friction values, with low friction during deployment, and higher friction during viewing and/or stowage. During deployment, the ideal force to deploy the video arm is "zero" (i.e., no force at all is required to lift the video arm up into the viewing position). However, since the force of gravity must be overcome, this would require that the video arm/monitor combination have zero mass, as mass converts to weight when acted upon by gravity. The one-way bearing/friction clutch combination therefore allows for the minimum deployment force (i.e., the amount of force required to lift the video arm/monitor against the force of gravity alone, with no additional friction coming from the one-way bearing 94 or from any other component that attaches the video arm to the seat or other structure. For example, if the video arm/monitor combination were to weigh six pounds, then it would require at least that amount of force to lift the video arm/monitor upwards to the fully deployed position. As discussed previously, the friction of the one-way bearing 124 in the direction of deployment is extremely low (e.g., so low that the friction is inconsequential) and, for all practical purposes, the video arm-plus-monitor deploys as described above, (i.e., with the minimum force required to simply lift a six-pound object upwards a few feet, with no additional friction to be overcome). Therefore, the force required to manually deploy the video arm (i.e., without assistance from springs, gas cylinders, or the like) cannot be brought to any lower value when the deployment direction is from a lower to a higher position. That is, the video arm could be deployed with lower force only by eliminating the influence of gravity, for example, by mounting the video arm onto a higher surface and deploying the video arm downwards rather than upwards (i.e., working with gravity instead of against it). The addition of springs, gas cylinders, hydraulic cylinders, electric motors, or other devices to help lift the video arm would not be a reduction in the amount of force required to deploy the video arm, but merely would be power-assisting the deployment (i.e., reducing the amount of force, if any, being manually applied). During deployment, the one-way bearing 124 is generally acting alone. That is, the friction clutch 98 does not come into play during deployment, except to hold the one-way bearing 124 in place. The rotation of the video arm occurs at the inner diameter of the one-way bearing 124 and as long as the one-way bearing 124 is held firmly on its outer diameter, there is no relative motion at the interface between the friction clutch 98 and the one-way bearing 124.

During stowage, the amount of manual force required to stow the video arm would be, for example, just one finger to lightly push the video arm back down into its stowage compartment. However, if the video arm could be pushed back into stowage that easily, the video arm would not hold stably in the deployed position during flight because of the influence of turbulence or other factors. Therefore, to move the video arm from the deployed position to the stowed position, the friction clutch/one-way bearing combination is designed to require a few ounces of force above and beyond the amount of force needed to keep the video arm stable during deployment. For example, if normal turbulence were to cause about two (2) pounds of force to act on the video arm, the friction clutch 98 would be adjusted such that the amount of force required to move the video arm from the deployed position to the stowed position would be at least 2.2 pounds. At the high end it would typically be as much as about seven (7) pounds of force. The high end of the friction setting is limited by the amount of force that the typical passenger can apply. Historically, seven (7) pounds has proven effective and acceptable. When the loading exceeds ten (10) pounds, some passengers find it a little too difficult to adjust and/or stow the arm. Preferably about five (5) pounds, plus or minus about two (2) pounds, would be the setting for the amount of force required to move the video arm from the deployed position to the stowed position. The amount of force required to move the video arm between the stowed and deployed positions and back again of course may vary depending on the size and weight of the video arm.

The asymmetrical quality of friction loading depending on the direction of arm motion is obtained by the differences in behavior of the one-way bearing versus the friction clutch, and by the manner in which rotational torque is transferred from one interface to another. For example, since the one-way bearing 124 is locked when moving the arm in the direction of stowage, at this stage there is no relative motion at the inner diameter of the one-way bearing 124 (i.e., at the interface between the spindle 110 and the one-way bearing 124). Instead, because the one-way bearing 124 is locked in this direction, the relative motion, if any, occurs only at the interface between the outer diameter of the one-way bearing 124 and the inner diameter of the friction clutch 98. As soon as the applied force exceeds a certain minimum value (i.e., a value sufficient to overcome the resistance of the grip of the friction clutch 98 against the outer diameter of the one-way bearing 124), the one-way bearing 124 will begin to rotate inside the aperture of the friction clutch 98. In use, therefore, the friction clutch 98 would be tightened to such an extent that about five (5) pounds of force, plus or minus two (2) pounds of force, would be required to overcome the grip and thereby move the video arm back to the stowed position, based on the relative motion occurring at the outer diameter of the one-way bearing 124. It will be apparent that while the presented embodiments picture the one-way bearing retained by the friction clutch which is connected to the base and the spindle which is connected to the knuckle, these relationships can be easily reversed. That is, the friction clutch can be connected to the knuckle and the spindle (or its equivalent) and be connected to the base.

In an alternative embodiment, the one-way bearing 124 is eliminated and the friction clutch 98 directly grips the spindle 110 of the knuckle mount 24 (with the spindle 110 rotating relative to the friction clutch 98 at an outer diameter of the shaft 112 of the spindle 110, that is, at an interface between the shaft 112 of the spindle 110 and the friction clutch 98). In this case, as the friction clutch 98 would be gripping the spindle shaft 112 with the same amount of force regardless of which direction the shaft 112 rotates (i.e., in the direction of deployment or in the direction of stowage), there is a higher amount of friction in the direction of deployment. A baseline of about five (5) pounds of force is required by the friction clutch 98 to grip the spindle shaft 112 to keep the video arm from falling backwards from the deployed position to the stowed position as gravity acts on the video arm to move the video arm into the stowed position.

The video arm as shown may in the alternative include any of various features not shown. For example, a reading light (not shown) could be attached to the video arm, powered separately or by batteries or as connected to the wiring harness 52, and located on a side of the mount 28 generally opposite the monitor 30 so that the passenger could read (e.g., magazines, newspapers, books, or the like), or write down information while also viewing the display screen of the monitor 30. Other devices, such as portable electronics containing music, video, and other content, could be similarly attached, and in some cases, could be integrated into the IFE system in such a way as to permit cooperative use of the video screen and related controls (i.e., effectively running the stored music and videos through the embedded IFE system).

A major consideration in video arm design is the routing of wiring harnesses through the video arm assembly. The wiring harness 52 comprises a bundle of electrical cables with specialized connectors at each end. The wiring harness 52 runs from the point inside the mount 28 where it is connected to the underside of the monitor 30 through the hollow interiors of the mount 28, elbow 66, arm shaft 26, knuckle mount 24, and base 22, and to the point where the wire harness 52 connects to the sources of IFE content and power below the base of the video arm 20.

The wiring harness is a critical component of the IFE system. Passengers can control which channel the monitor 30 is set to via controls (not shown) located on the passenger's seat or seating console that are electrically connected to the monitor 30 via the internal wiring system. In some cases, seating consoles or seats on the aircraft may also include connectors for docking various electronic devices (iPods or similar devices, iPads or similar devices, smartphones, laptop computers or the like) which allow the electronic devices to make use of the display screen of the monitor 30.

In an illustrative embodiment, the manner in which the wiring harness 52 is routed through the arm assembly 20 offers significant improvements in terms of the way the harness 52 is protected from damage, and in the capacity of wires that can be accommodated (i.e., the ability to accept cables of larger diameters). A goal is to ensure that the individual wires of the harness 52 are not damaged by twisting or bending at various points along the routing path through the arm 20. One of these points is at the lower end of the video arm assembly 20, where the wiring harness 52 must enter the video arm assembly 20 through the base 22 (see FIGS. 8-10) and pass through the knuckle mount 24, then pass through the arm clutch 46 and tubular shaft 40 of the hollow tubular mount 38. As the wiring harness 52 enters the base 22 to pass through into the cavity or recess 108 of the knuckle mount 24, the wiring harness 52 turns about ninety degrees to enter the knuckle mount 24. During service in flight, the wiring harness 52 in this section of the video arm assembly 20 is subjected to the motion of the arm shaft 26 turning on its vertical axis, and the pivoting of the video arm assembly 20 at the knuckle mount 24, while also bending at a right angle. A cavity defined by the first arm portion 78 of the base 22 and knuckle mount 24, where the wiring harness 52 must exit/enter the first arm portion 78 of the base 22 and exit/enter the knuckle mount 24, is very limited. The size of the cavity at this location cannot simply be expanded, since it is also desirable to limit the footprint of the video arm assembly 20 at the point where the video arm assembly 20 attaches to the seating console or other surface (a surface of an interior wall of a recess formed in a seating console where the recess is used to contain the assembly 20 when the assembly 20 is in the stowed position). One factor contributing to why the cavity or recess 108 of the knuckle mount 24 is able to provide more space for the wire harness 52 is the configuration of the spindle 110 as the spindle 110 is positioned within the recess 108 and connected directly to the side 120 of the knuckle mount 24. The low profile of the spindle 110 combined with the location of where the spindle 110 attaches to the knuckle mount 24, provide more room for the wiring harness 52. Another factor is the use of at least one roller 140 on the knuckle mount 24 to engage the track 94 of the base 22. These two features minimize the footprint of the base 22 while allowing the maximum amount of free space inside the bracket cavity 108 for passage of the wiring harness 52.

Although the present invention has been discussed above in connection with use on a passenger aircraft, the present invention is not limited to that environment and may also be used on passenger trains, cars, buses and other vehicles including, but not limited to, carts, carriages, and devices mounted on rails.

Likewise, the present invention is also not to be limited to use in vehicles and may be used in non-vehicle or stationary environments where it is desirable to stow and deploy video monitors or other types of devices, such as on film sets, or in hospitals, factories, garages, shipyards, construction sites and the like.

Furthermore, the present invention is not limited to use with video monitors and may be used with a wide variety of electronic, mechanical, electro-mechanical, or other devices, such as computers, keypads, illumination sources, cameras, microscopes and other magnifying devices, scanners, robotics, lasers, ultrasound imagers or other medical equipment, and any other kind of screen display, tool, or other component requiring or benefitting from single- or multi-axis articulation, with or without internal wiring, fiber-optics, or other items running through the center of the arm.

In addition, the claimed invention is not limited in size and may be constructed in miniature versions or for use in very large-scale applications in which the same or similar principles of motion and friction control as described above would apply. Furthermore, the figures (and various components shown therein) of the specification are not to be construed as drawn to scale.

The following claims are thus to be understood to include what is specifically illustrated and described above, what is conceptually equivalent, what can be obviously substituted and also what incorporates the essential structure of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

I claim:

1. A video arm assembly, comprising: a base directly attachable to a surface; a knuckle rotatably engaging the base, wherein the knuckle includes a spindle, and wherein a portion of the knuckle is disposed within the base; an arm connected to the knuckle so as to rotate with the knuckle; a friction clutch disposed within the base; a one-way bearing engaging the friction clutch and the spindle, providing rotation of the knuckle with respect to the one-way bearing and the base in a first direction, and wherein the one-way bearing is disposed between the spindle and the friction clutch; wherein the friction clutch engages the one-way bearing so that when the knuckle rotates with respect to the base in a second direction opposite the first direction, the one-way bearing rotates with the knuckle in the second direction.

2. The video arm assembly of claim 1, further comprising a mount engaging the arm opposite the knuckle.

3. The video arm assembly of claim 2, wherein the mount is rotatable relative to the arm.

4. The video arm assembly of claim 2, in combination with a video monitor, wherein the video monitor is rotatable relative to the arm when supported by the mount.

5. The video arm assembly of claim 1, wherein the arm is rotatable relative to the knuckle.

6. The video arm assembly of claim 1, wherein the base includes a track, the knuckle engages the track, and the track limits rotation of the knuckle.

7. The video arm assembly of claim 6, wherein the knuckle includes rollers engaging the track.

8. The video arm assembly of claim 1, wherein the base limits rotation of the arm.

9. The video arm assembly of claim 1, further comprising a stop; and a latch removably engaging the stop wherein the latch prevents movement of the knuckle in the first direction when the latch engages the stop.

10. The video arm assembly of claim 1, wherein the friction clutch comprises an adjustable friction clutch.

11. A video arm assembly, comprising: a base directly attachable to a surface; a knuckle rotatably engaging the base, wherein the knuckle includes a spindle, and wherein a portion of the knuckle is disposed within the base; an arm connected to the knuckle to rotate with the knuckle; a mount engaging the arm opposite the knuckle; a friction clutch disposed within the base; a one-way bearing engaging the friction clutch and the spindle, providing rotation of the knuckle with respect to the one-way bearing and the base in a first direction, and wherein the one-way bearing is disposed between the spindle and the friction clutch; a stop connected to the knuckle; a latch removably engaging the stop wherein the latch prevents movement of the knuckle in the first direction when the latch engages the stop; wherein the friction clutch engages the one-way bearing such that when the knuckle rotates with respect to the base in a second direction opposite the first direction, the one-way bearing rotates with the knuckle in the second direction.

12. The video arm assembly of claim 11, wherein the mount is rotatable relative to the arm.

13. The video arm assembly of claim 11, in combination with a video monitor, wherein the video monitor is rotatable relative to the arm when supported by the mount.

14. The video arm assembly of claim 11, wherein the arm is rotatable relative to the knuckle.

15. The video arm assembly of claim 11, wherein the base includes a track, the knuckle engages the track, and the track limits rotation of the knuckle.

16. The video arm assembly of claim 15, wherein the knuckle includes rollers engaging the track.

17. The video arm assembly of claim 11, wherein the base limits rotation of the arm.

18. The video arm assembly of claim 11, wherein the friction clutch comprises an adjustable friction clutch.

19. A video arm assembly, comprising: a base directly attachable to a surface; a knuckle rotatably engaging the base, wherein a portion of the knuckle is disposed within the base; an arm connected to the knuckle so that the arm rotates with the knuckle; a mount engaging the arm opposite the knuckle for supporting a video monitor, wherein the mount is rotatable relative to the arm; an adjustable friction clutch disposed within the base; a one-way bearing engaging the friction clutch and the knuckle, providing rotation of the knuckle with respect to the one-way bearing and the base in a first direction, wherein the knuckle includes a spindle engaging the one-way bearing, and wherein the one-way bearing is disposed between the spindle and the friction clutch; a stop connected to the knuckle; a latch removably engaging the stop wherein the latch prevents movement of the knuckle in the first direction when the latch engages the stop; wherein the friction clutch engages the one-way bearing whereby when the knuckle rotates with respect to the base in a second direction opposite the first direction, the one-way bearing rotates with the knuckle in the second direction, and wherein the base includes a track, the knuckle includes rollers engaging the track, and the track limits rotation of the knuckle.

\* \* \* \* \*